United States Patent

Maurer et al.

[11] 4,023,358
[45] May 17, 1977

[54] INTERNAL COMBUSTION ENGINE REACTOR PROTECTIVE CONTROL SYSTEM

[75] Inventors: Helmut Maurer, Schwiedingen; Karl Heinz Keerl, Bissingen, both of Germany

[73] Assignee: Robert Bosch G.m.b.H., Stuttgart, Germany

[22] Filed: Apr. 8, 1974

[21] Appl. No.: 458,777

[30] Foreign Application Priority Data

Apr. 18, 1973   Germany ........................ 2319576

[52] U.S. Cl. .................................. 60/277; 60/285; 123/198 D; 123/198 DB; 123/198 F
[51] Int. Cl.² ....................................... F02B 75/10
[58] Field of Search ......... 60/277, 285; 123/198 D, 123/198 DB, 179 L, 32 EA

[56] References Cited

UNITED STATES PATENTS

| | | | |
|---|---|---|---|
| 2,714,883 | 8/1955 | Metzger | 123/198 DB |
| 3,216,409 | 11/1965 | Puster | 123/198 D X |
| 3,472,068 | 10/1969 | List et al. | 60/277 X |
| 3,576,182 | 4/1971 | Howland | 123/140 MC X |
| 3,820,326 | 6/1974 | Inoue et al. | 60/285 X |
| 3,841,291 | 10/1974 | Ludewig et al. | 123/198 DB |
| 3,916,622 | 11/1975 | Gospodar | 123/198 DB X |

Primary Examiner—Charles J. Myhre
Assistant Examiner—Tony M. Argenbright
Attorney, Agent, or Firm—Flynn & Frishauf

[57] ABSTRACT

A sensing means is provided to monitor combustion of fuel and air supplied to an internal combustion engine, for example by sensing ignition pulses, combustion pressure, or cylinder temperature. Signals, as sensed, are compared and if one of these signals is extreme with respect to an average and, at the same time, the temperature of a catalytic reactor in the exhaust system becomes excessive, supply of the combustible fuel-air mixture to the specific cylinder is interrupted. To permit starting with unequal heating of cylinders, interruption of supply of the combustible fuel-air mixture is cancelled during starting, as sensed, for example, by closing of the starting switch, or low temperature in the engine system.

8 Claims, 1 Drawing Figure

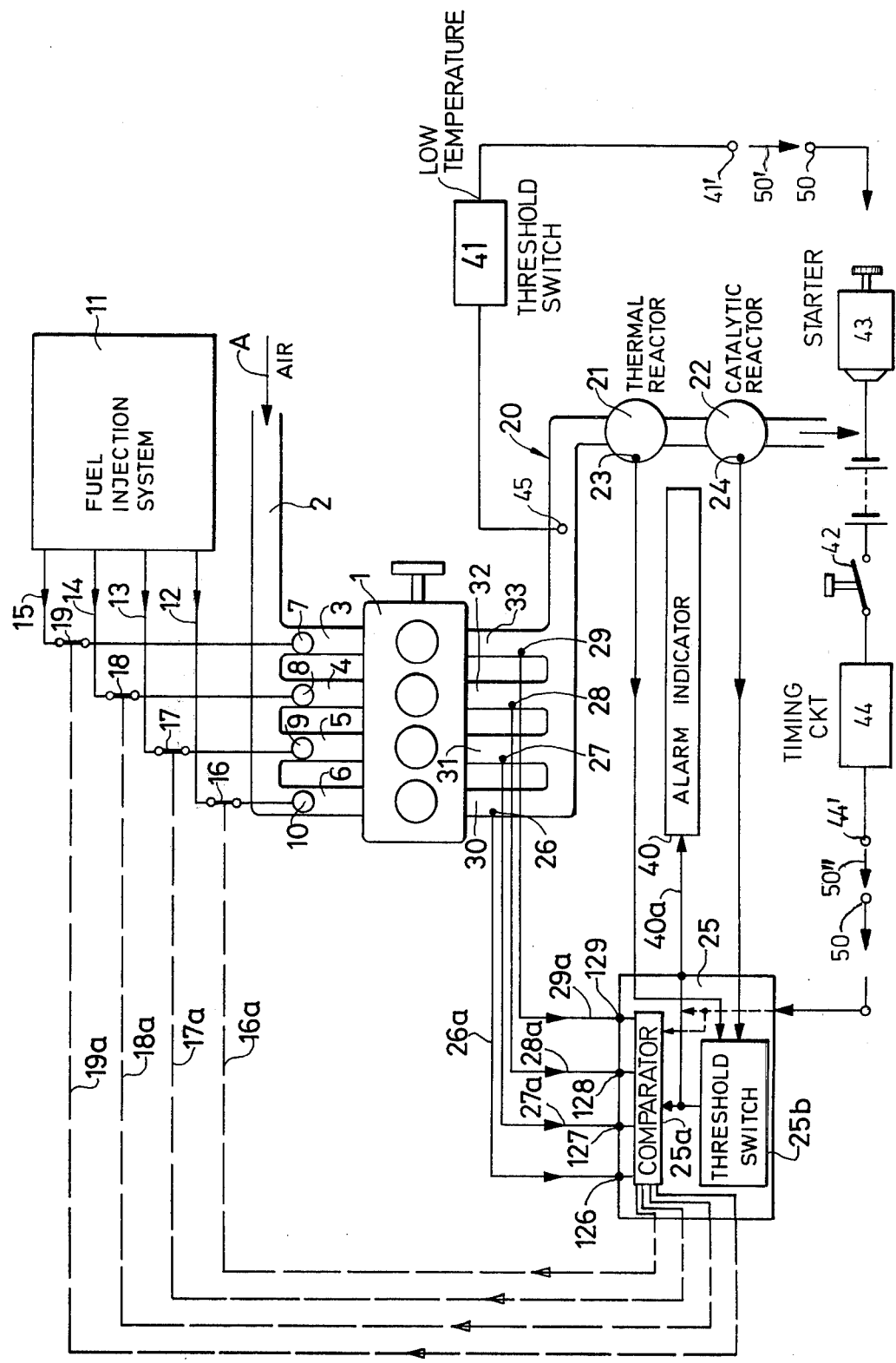

INTERNAL COMBUSTION ENGINE REACTOR PROTECTIVE CONTROL SYSTEM

Cross reference to related patent and commonly assigned applications:

U.S. Pat. No. 3,483,851;

U.S. Ser. No. 332,040, filed Feb. 12, 1973, Glockler, now abandoned;

U.S. Ser. No. 472,885 filed May 23, 1974, (claiming German Priority No. P 23,40,541.6);

U.S. Ser. No. 465,351 filed Apr. 27, 1974; (claiming German Priority No. P 23,30,258.1). The present invention relates to internal combustion engine systems and more particularly to control of a protective system for reactors installed in the exhaust system of internal combustion engines.

Cross-referenced application Ser. No. 332,040, Glockler, filed Feb. 12, 1973, now abandoned, assigned to the assignee of the present invention, describes a system in which reactors, designed to reduce noxious emissions of exhaust gases, are protected from excessive temperatures. The present invention is an improvement of said system, and the disclosure of the aforementioned application is incorporated herein.

Briefly, various types of exhaust gas treatment systems are proposed; a detailed discussion is found in the above cross-referenced application. These systems include catalytic reactors which are particularly sensitive to excessive temperatures. Excessive temperatures may arise in reactors, during engine operation, due to malfunction of the engine itself. If, for example, there is trouble in the ignition system such that one or more cylinders of the internal combustion engine are supplied with combustible air-fuel mixture which is not burned, however, extremely high temperatures may arise which lead to destruction of the catalytic reactors. The air-fuel mixture which is still combustible is exhausted from the cylinder without having been burned, or burned only incompletely, and is applied, as such, to the catalytic reactors connected to the internal combustion engine. The catalysts therein, already at high temperature level, are supplied suddenly with additional excess energy so that the temperature at the catalyst will rise, and rise rapidly to a level at which damage of the reactor system may result.

The cross-referenced application Ser. No. 332,040 describes a system in which faulty combustion is monitored, and signals indicative of combustion events in the various cylinders of an internal combustion engine are compared, an extreme value of one of the signals with respect to the average of all the signals being indicative of malfunction in any one of them. It may occur that an excessive temperature signal is not properly applied from a sensing element connected to the various reactors in the engine system, or that the protective system, as described, functions by merely comparing the signals from the various cylinders, indicative of combustion events. The temperature of the internal combustion engine may be low, under such conditions, due to the fact that the engine had been idle for a long time, and is cold. The combustion events in the various cylinders of the internal combustion engine cause exhaust gases therefrom which are not emitted from the cylinders, simultaneously, but rather sequentially in accordance with the firing order of the cylinders. Temperature sensors, for example associated with the various cylinders, or the exhaust stubs leading from the cylinders to the exhaust manifold could, therefore, undesirably trigger a comparison circuit if, for example, one cylinder of the internal combustion engine heats rapidly whereas the other cylinders are not yet hot, so that a comparison circuit will supply an extreme value signal. This situation may arise upon starting, so that the protective circuit and system, as explained in the cross-referenced application Ser. No. 332,040, becomes effective and inhibits or blocks application of the combustible fuel-air mixture to the cylinders without malfunction being present. Upon starting it may occur that the internal combustion engine starts only with great difficulties, and only with a portion of the cylinders with which it is equipped.

It is an object of the present invention to overcome starting difficulties in engines equipped with a system of the cross-referenced and herein incorporated application Ser. No. 332,040, and to ensure reliable starting.

SUBJECT MATTER OF THE PRESENT INVENTION

Briefly, a means is provided to sense if starting conditions pertain. This may, for example, be a temperature sensor, or a circuit connected to the starter of the engine, indicative that the engine is being started. This circuit is then connected to the system which inhibits application of combustible fuel-air mixture to any one of the cylinders, to disable the inhibiting circuit, so that all cylinders will be supplied with fuel-air mixture, as commanded by engine control. The present system is, therefore, provided to override the interrupting system, under starting conditions.

The invention will be described by way of example with reference to the accompanying drawing, wherein the single FIGURE illustrates the additional system over and above the monitoring system of the aforementioned cross-referenced application Ser. No. 332,040 now abandoned.

Only a single FIGURE is being presented, the FIGS. 2-6 of the cross-referenced application being herein incorporated by reference. The present invention is applicable to all the embodiments and features of FIGS. 1-6 of the cross-referenced application.

Internal combustion engine 1, shown as a four-cylinder engine for purposes of this explanation, has air supplied thereto through inlet manifold 2, as indicated by arrow A. Inlet manifold 2 branches into inlet stubs or branches 3, 4, 5, 6. Each one of the inlet branches 3–6 has a fuel injection valve 7, 8, 9, 10 associated therewith, to inject fuel into the inlet stub or branch. The fuel injection valves 7–10 are opened for a predetermined period of time, depending on power requirements and operating parameters of the engine, by a fuel injection control system 11 which may, for example, be of the type of the cross-referenced U.S. Pat. No. 3,483,851. Electrical control lines 12, 13, 14, 15 connect the fuel injection system 11 to the injection valves 7–10. A break, that is an opening switch 16, 17, 18, 19 is included in the respective lines 12–15.

The exhaust system 20 of the internal combustion engine includes a thermal reactor 21 and a catalytic reactor 22. Noxious exhaust gases are reduced in the reactors, thermal reactor 21 acting as an after-burner to oxidize any remaining CO, and unburned hydrocarbons, and providing a slightly reducing atmosphere to catalytic reactor 22 in which the $NO_x$ components are reduced.

Temperature sensors 23, 24 are located in the reactors 21, 22, respectively. The temperature sensors 23, 24 are connected to a control unit 25. Control unit 25 is additionally connected to temperature sensors 26, 27, 28, 29 located in the exhaust branches or stubs 30, 31, 32, 33 of the exhaust manifold, and forming part of the exhaust system 20 of internal combustion engine 1. Sensors 26–29 are connected to junctions 126–129 on the control unit 25 by means of control lines 26a–29a. Depending on the temperature relationships sensed by sensors 23, 24 associated with the reactors, and the temperatures in the exhaust stubs 30–33, as communicated to the control system 25 over junctions 126–129, the control system provides output signals on output lines 16a–19a to the switches 16, 19 to interrupt the specific connection line 12, 13, 14, 15, from the fuel injection system 11 to the respective valves 7, 8, 9, 10 to isolate the inlet branch or stub leading to the particular cylinder in which trouble has been sensed, that is, interrupting the supply of fuel to the respective cylinder of engine 1.

The control unit 25 includes, internally, a comparator 25a and a threshold switch 25b. The output of the comparator 25a is connected to the respective lines 16a–19a.

Operation

The sensing elements 23, 24, sensing temperature of the reactors 21, 22 provide temperature sensed output signals. If these output signals exceed a certain threshold level, as determined by the threshold switch 25b, to which the sensed temperature signals are connected, a signal is derived from the threshold switch which will be compared in comparator 25a with the signals applied to junctions 126–129 from the sensors 26–29 in the exhaust system of the engine. The comparator 25a determines which one of the respective cylinders of engine 1 does not have normal combustion of the fuel, that is, which of the cylinders is responsible for increase of the temperature in the reactors 21, 22, respectively. The threshold levels for the two reactors 21, 22 need not be the same and the threshold switch 25b may actually be a two-part switch, providing an output signal if different threshold levels are sensed by the sensors 23, 24, respectively. This can be done, easily, by applying the connection from the sensors 23, 24 to an input stage of the threshold switch which includes, for each sensor, a separately tapped resistor. The reactor temperature, as sensed by the temperature sensors 23, 24, and after having triggered threshold switch 25b, is compared with the temperature signals applied at junction 126, 129, and that junction is selected which indicates the lowest temperature sensed in all the exhaust branches or stubs. This is the cylinder which causes difficulty, that is, the cylinder in which no combustion took place, and the comparator 25a will provide an output signal identifying the specific cylinder (having the lowest signal derived from sensors 26–29) and the respective interruptor switch 16, 17, 18, 19 will be operated over control lines 16a, 17, 18a, 19a, respectively. Simultaneously, an optical or other alarm indicator 40 is energized over an alarm line 40a, so that the operator, for example the driver of an automotive vehicle, will be given an indication that one of the cylinders of the engine is not functioning properly. The particular signal representative of improper operation, that is, improper combustion in any one cylinder, is identified in the comparator by summing the signals from all the cylinders, and then providing an average, summed signal. The individual signals from the cylinders are compared with the summed signal. That one of the individual cylinder signals which has an extreme value with respect to the averaged signal then will identify the particular cylinder in which the combustion event is improper.

The specific cylinder which is responsible for trouble in the entire motive system, including the exhaust, thus does not receive a fuel-air mixture for combustion, or for subsequent, non-combusted exhaust. In the example of FIG. 1, supply of fuel to the respective cylinder is interrupted by opening the control into the respective fuel injection valve. Different connections, or structures can be used; rather than utilizing switches 16–19 to break the connection lines, switches could be used to short-circuit, or bypass opening pulses from the fuel injection system around the respective injection valves 7–10. Switches 16–19 may be semi-conductor switches, relays, or otherwise controlled switches operating under control signals applied from lines 16a–19a, respectively.

The system, as described, interrupts fuel supply to the specific cylinder in which combustion does not occur anyway. Thus, interruption of fuel to the specific cylinder does not additionally interfere with operation of the engine.

In a preferred form, the temperature sensors 26–29 are located as close to the exhaust valves from the respective cylinders as possible, so that, effectively, the temperature at the exhaust valves themselves is being measured. It is also possible to measure the temperature of the exhaust gases from the cylinders arising in the exhaust stubs or branches at a somewhat more remote point, for example along or on the respective exhaust manifold connection, the connection to the cylinder block, near the stubs, or near the point at which the various exhaust stubs or braches merge into the manifold itself. These temperatures, as sensed, then can again control interruption of combustible mixture to the respective cylinder, if an over-temperature condition has been sensed by sensors 23, 24. Thus, sensors 23, 24 determine the over-temperature condition, and sensors 26–29 identify the source of trouble and, upon sensing of an over-temperature condition as determined by threshold switch 25b, effect isolation of the respective cylinder, to provide a self-controlling, fail-safe system.

In accordance with a feature of the invention, the temperature is not sensed adjacent the exhaust valves or the exhaust stubs or manifold of the system, but rather in the cylinders heads of the internal combustion engine directly. Since the cylinder head is cooled, frequently water-cooled, temperature sensors operative at lower temperatures can be used, thus simplifying the construction and permitting use of cheaper sensing elements.

A temperature sensor 45 is provided located, for example, in the exhaust system 20 of the engine. The temperature sensor 45 is connected to a threshold switch 41, which senses that a certain predetermined minimum temperature has been reached, before the aforementioned monitoring and protective system can become effective. Threshold switch 41 provides an output signal at terminal 41', which is connected, as schematically indicated by arrow 50', to a terminal 50 connected to the control unit 25. Terminal 50 is so connected to the control unit, as indicated by dashed lines, that control unit 25 is blocked, that is, is rendered inoperative. Thus, regardless of signals which may be derived from sensors 23, 24, or the relative values of signals applied at terminals 126–129, with respect to any one specific signal applied to the terminals 126–129, no output can be derived from comparator 25a, to disable injection of fuel by any one of the valves 7–10, by opening of any one of the switches 16–19 from the fuel injection system 11. Thus, the interrupting control 25 is disabled until a signal is derived from threshold switch 41 that the temperature of the engine system, as sensed by sensor 45, has reached a certain minimum temperature.

The temperature sensor 45 can be located in any desired position in the engine system; it may be located in the immediate vicinity of the engine, for example, or in the exhaust system thereof. The temperature sensor 45 may be considered symbolic, and may include a plurality of temperature sensors, located at various positions, and all providing signals to the threshold switch 41, which will respond to the highest thereof. The temperature sensors 26–29 may also be used and be connected to the threshold switch 41; they may then be deemed to be collectively represented by sensor 45. Other sensors located, for example, in the cooling water, in the cooling air, in the motor block, or sensitive to motor oil temperature may be used, and sensor 45 may be connected to other threshold switches, or to other control circuits and have other functions, for example operating a temperature gauge, or indicator light for the operator.

Disabling the control circuit 25, from terminal 50, also disables an alarm indication over line 40a, so that the alarm indicator 40 will not operate; in another form, however, the alarm indicator is not disabled, so that, during starting and when the engine is cold, the alarm indicator will light, thus indicating operativeness of the indicator itself.

The undesired interruption of application of the combustible air-fuel mixture upon starting of the internal combustion engine can also be inhibited by providing a circuit connected to the starter switch itself. Starter switch 42, connected to the battery (shown symbolically) and to the starter 43 is additionally connected to a timing circuit 44, which establishes a timing interval upon closing of the starter switch. The output signal of the timing circuit 44, beginning immediately upon closing of the starter switch, is connected from terminal 44' over connection, symbolically shown by arrow 50", to terminal 50 which is the cancellation, or disabling terminal for control unit 25. The timing circuit 44 is set for a predetermined timing period, which may, for example, be long enough to start the engine, and then continue until the engine runs smoothly. A suitable timing interval is from 15 to 60 seconds, for example about 20 to 30 seconds, for usual automotive-type internal combustion engines. During this timing period, the interrupting control circuit 25 is disabled. The timing period is selected to be short enough so that critical temperatures of the thermal reactors 21, 22 cannot be reached. After the timing period has elapsed, the control system 25 again becomes operative, and interrupt application of a combustible air-fuel mixture to the respective cylinders.

The embodiments of the invention shown in FIGS. 2–6 of the cross-referenced application Ser. No. 332,040 are equally applicable to the present invention which is directed to overriding or disabling the control circuit which disables application of a combustible fuel-air mixture to a respective cylinder, or group of cylinders of the internal combustion engine, as sensed by sensing characteristics of a combustion event (temperature in the exhaust; temperature in the combustion chamber, or pressure in the combustion chamber) and then controls application of fuel, or air, in highly insufficient or greatly excessive quantity to the respective cylinder, or group of cylinders, to prevent excessive reactor temperatures from arising.

The timing period may also be set long enough to extend for the duration of warm-up of the engine which, usually, is two to three minutes. The length of time duration of timing circuit 44 will depend on individual engine and design considerations.

The threshold switch 25b may not be strictly necessary. The output from sensors 23, 24, or any one of them, could be applied directly to the comparator 25a to effect comparison between the average of the signal from the sensors 25–29 and sensor 23 and/or sensor 24, and to determine an extreme. The connection to the comparator may be through a threshold switch to disable the signal from the sensor, or to provide a phantom or simulated signal, so that low temperature values sensed at sensors 23, 24 will not influence, disadvantageously, the comparison in comparator 25a. If the threshold or threshold switch 25b is set for higher temperature values, for example temperature values in excess of normal operating temperature, the output from sensors 23, 24, above the threshold level, can be applied directly to the comparator 25a to form part of the summed, composite, and averaged signal with respect to which the signal applied at any individual input is compared. If desired, normalization of the signals with respect to each other (to compensate for differences, for example, in externally expected cooling) may be used so that the comparator can effect true comparison of signals representative of temperatures (or ignition events) to be compared. Such normalization of signals can readily be instrumented by passing the respective signals through voltage dividers of appropriate voltage division ratios.

Various changes and modifications may be made within the scope of the invention concept.

We claim:

1. In an internal combustion engine system in which the engine has a normal operating temperature above ambient temperature, the system having a catalytic reactor and a reactor protective system including engine operation sensing means (26–29) located in sensing relation to at least two of the cylinders of the engine and sensing a characteristic of a combustion event in the respective cylinder to monitor combustion of fuel and air supplied thereto, and providing a combustion monitor signal upon detection of conditions indicative of failure of combustion in a respective cylinder; and interrupting means (16–19; 25) controlled by said monitor signal interrupting supply of combustible mixture of air and fuel to the respective cylinder to protect the reactor against entry of uncombusted mixture thereinto, the improvement comprising a low-temperature sensor means (45, 23, 24; 26–29) providing an override signal to said interrupting means (16–19; 25) to disable said interrupting means when the sensed temperature is below normal engine operating temperature level at which the exhaust gases have a predetermined temperature sufficient for detoxification in the catalytic reactor, the sensor being in temperature sensing relation with a component of the engine system and providing an output signal (41') when the temperature of the component is below said normal level, to disable said interrupting means and permit application of combustible air-fuel mixture to the engine regardless of presence of a combustion monitor signal indicative of failure of combustion.

2. In the system of claim 1, wherein the low temperature sensor means (45) is located in the exhaust system of the engine.

3. In the system of claim 1, wherein the low temperature sensor means (45) is located closely adjacent the engine (1).

4. In the system of claim 1, wherein the engine system includes a motor block component, a motor oil component, a cooling system component; and the low-temperature sensor means (45) is located in temperature sensing relation with respect to one of said components.

5. In the system of claim 1, further comprising a threshold switch (41) having its input connected to the low-temperature sensor means (45) and providing the override signal to the interrupting means (16–19; 25) when the level of the signal provided by the low-temperature sensor means, and representative of said below normal temperature falls below the threshold level of said threshold switch.

6. In the system of claim 1, wherein the engine system includes a starter switch (42) and connecting circuit means interconnecting the starter switch (42) and said interrupting means (16–19; 25) and providing a start-override signal to the interrupting means to disable said interrupting means upon operation of said starter switch and permit application of combustible air-fuel mixture to the engine regardless of presence of a combustion monitor signal indicative of failure of combustion.

7. In the system of claim 6, wherein the connecting circuit means comprises a timing circuit (44) connected to and controlling disabling of said interrupting means (16–19; 25), said starter switch (42) being connected to said timing circuit to energize the timing circuit and thus start a timing period to disable the interrupting means during the timing period commencing upon starting of the engine.

8. In the system of claim 7, wherein the time interval of the timing means is about 15–60 seconds.

* * * * *